3,119,795
POLYSULFIDE POLYMERS PRODUCED BY REACTION OF DIALKALI METAL HYDROCARBONS WITH SULFUR HALIDES
Robert E. Robinson and Michael W. Mueller, Cincinnati, Ohio, assignors to National Distillers and Chemical Corporation, New York, N.Y., a corporation of Virginia
No Drawing. Filed Dec. 14, 1959, Ser. No. 859,114
4 Claims. (Cl. 260—79)

This invention relates broadly to novel polysulfide polymers and their production and, more particularly, to such polymers produced by reaction of certain organometallic compounds with sulfur halides. More specifically, the invention relates to novel polysulfide polymers produced by reaction of a dialkali metal hydrocarbon with a sulfur halide.

The invention is based on the discovery that polysulfide polymers may be prepared in good quality and high yields by reacting a dialkali metal hydrocarbon with a sulfur halide. Suitable for use as the dialkali metal hydrocarbon are substances such as disodiooctadiene, isomeric mixtures thereof, and, in general, dialkali metal hydrocarbons of 4 to 20 carbon atoms, such as dipotassiodiphenylbutane, disodiodiphenylbutane, disodiodiphenyldimethylbutane, disodiodimethyloctadiene, disodioterpenes, disodiodihydrobenzene, disodiopyridine, the sodium adduct of naphthalene, and the like. For reaction therewith, sulfur chlorides such as sulfur monochloride and sulfur dichloride are preferred, but other halides may be used, such as sulfur bromides, sulfur iodides, and others.

In practice of this invention, the quantity of dialkali metal hydrocarbon employed may range from about 0.5 to about 2 moles per mole of sulfur halide. Preferably, however, the reaction is carried out using approximately a mole to mole ratio of the dialkali metal hydrocarbon to sulfur halide.

Although the desired reaction can be carried out in the absence of a reaction medium, it is preferably carried out in the presence of a suitable inert diluent, such as, for example, alkylate, tetrahydrofuran, hexane, dimethyl ether, trimethylamine, or benzene. When used, the amount of reaction medium is not critical, but generally is used in an amount corresponding to about 1 to 100 parts of diluent to 1 part of sulfur halide, and preferably about 5 to 70 parts of diluent to 1 part of sulfur halide.

The reaction of dialkali metal hydrocarbon with a sulfur halide takes place readily at any temperature below the decomposition temperature of the particular reactants employed. For example, when substances such as disodiooctadiene and sulfur monochloride are used, the reaction may occur at a temperature between approximately $-75°$ and $+75°$ C.

The polysulfide polymers produced as described herein possess utility as fuel binding agents in solid propellants for rockets, in oil- and solvent-resistant gaskets, in sealing compounds, and the like.

The more detailed practice of the present invention is illustrated by the following examples wherein parts are given by weight unless otherwise specified. These examples are illustrative only and are not intended to limit the invention in any way except as indicated by the appended claims.

*Example 1*

An oven-dried flask was charged with 7 parts (0.05 mole) of sulfur monochloride dissolved in 200 parts (by volume) of n-hexane. The flask was fitted with a paddle-type stirrer, a thermometer, an outlet to a nitrogen bubbler system, and a tube for dialkali metal hydrocarbon addition. To the addition tube was added 50 parts (0.003 mole) of 0.6 molar disodiooctadiene in alkylate diluted with 50 parts of n-hexane. The disodiooctadiene was added over a period of about 110 minutes while the temperature was held at about 25–30° C. The mixture was then stirred for about 20 minutes and allowed to stand overnight. It was then treated with 200 parts of water and filtered by suction, giving 6 parts (84 percent of theoretical) of an amorphous solid which softened slightly at 175° C. and decomposed at 205° C. The solid was compressed in a Carver press at 175° C. to yield a dark, smooth film of rubber. The product had the following composition: 46.6% C, 5.8% H, 38.1% S, and 9.5% Cl.

*Example 2*

The procedure of Example 1 was repeated, except that the disodiooctadiene and 200 parts of hexane were charged directly into the reaction flask, and the sulfur monochloride in 50 parts of hexane was added dropwise over about 100 minutes at about 25–30° C. 5.8 parts (82% of theoretical) of a polysulfide polymer was obtained which contained 49.2% C, 6.2% H, 38.4% S, and 6.2% Cl.

*Example 3*

The procedure of Example 1 was repeated, except that the disodiooctadiene was added to the sulfur monochloride at $-65°$ to $-75°$ C. The yield was 6.2 parts (88% of theoretical) of a polysulfide polymer having properties similar to those of the polymer obtained by the process of Example 1.

*Example 4*

The procedure of Example 1 was repeated, except that 50 parts (0.03 mole) of disodiooctadiene was added to 5.0 parts (0.05 mole) of sulfur dichloride in hexane over about 95 minutes at room temperature. The yield was 3.3 parts of a polysulfide polymer resembling that obtained from disodiooctadiene and sulfur monochloride. The product contained 44.8% C, 5.6% H, 30.8% S, and 18.9% Cl.

*Example 5*

The procedure of Example 4 was repeated, except that the sulfur dichloride was added to the disodiooctadiene. Comparable results were obtained, both in yield and in properties.

*Example 6*

The procedure of Example 4 was repeated, except that tetrahydrofuran was used instead of hexane. Comparable results were obtained.

*Example 7*

To 16.9 parts of sulfur monochloride in a nitrogen-blanketed, magnetically-agitated flask was added disodiodiphenylbutane in 100 parts by volume of a 2:1 mixture of alkylate and dimethyl ether over 20 minutes at $-20$ to $-30°$ C. After standing overnight, the mixture was treated with 100 parts of water. A solid separated out and was collected. On drying, it yielded 18 parts of a polysulfide polymer resembling those produced in previous examples.

*Example 8*

A solution of the sodium adduct of naphthalene in 330 parts by volume of tetrahydrofuran was prepared from 74.5 parts of naphthalene and 40 parts of a 33.3% dispersion of sodium in alkylate. To this was added 38.9 parts of sulfur monochloride over 75 minutes at 25° C., the temperature being maintained by external cooling. The mixture was stirred for 20 minutes and then treated with 200 parts of water. Filtration and drying yielded 9.9 parts of solid polymer resembling those produced in previous examples.

While above are disclosed but a limited number of embodiments of the invention presented herein, it is possible to produce still other embodiments without departing

What is claimed is:

1. A process for preparing a polysulfide polymer which comprises reacting a dialkali metal hydrocarbon having 4 to 20 carbon atoms, said hydrocarbon being selected from the group consisting of diene and aromatic hydrocarbons, with a sulfur halide at a temperature below the decomposition temperature of said dialkali metal hydrocarbon and sulfur halide.

2. The process of claim 1 wherein the reaction is carried out using about 0.5 to about 2 moles of dialkali metal hydrocarbon per mole of sulfur halide.

3. The process of claim 1 wherein the reaction is carried out with a substantially mole to mole ratio of the dialkali metal hydrocarbon to the sulfur halide.

4. The process of claim 1 wherein the dialkali metal hydrocarbon is selected from the group consisting of disodiooctadiene and disodiodiphenylbutane and the sulfur halide is selected from the group consisting of sulfur monochloride and sulfur dichloride.

References Cited in the file of this patent

UNITED STATES PATENTS

| | | |
|---|---|---|
| 2,363,614 | Patrick et al. | Nov. 28, 1944 |
| 2,411,275 | Kinneberg et al. | Nov. 19, 1946 |
| 2,411,276 | Kinneberg et al. | Nov. 19, 1946 |
| 2,417,093 | Sparks et al. | Mar. 11, 1947 |
| 2,773,092 | Carley et al. | Dec. 4, 1956 |
| 2,906,739 | Bruckner et al. | Sept. 29, 1959 |

FOREIGN PATENTS

| | | |
|---|---|---|
| 314,524 | Great Britain | Oct. 13, 1930 |
| 119,069 | Australia | Oct. 10, 1944 |